April 15, 1969  L. G. SMITH ET AL  3,438,678
METHOD AND APPARATUS FOR CONVEYING MATERIALS
Filed Aug. 11, 1966  Sheet 1 of 5

Larry G. Smith
Gordon H. Blake
Jim P. Van Way
INVENTORS

BY Hayden & Pravel
ATTORNEYS

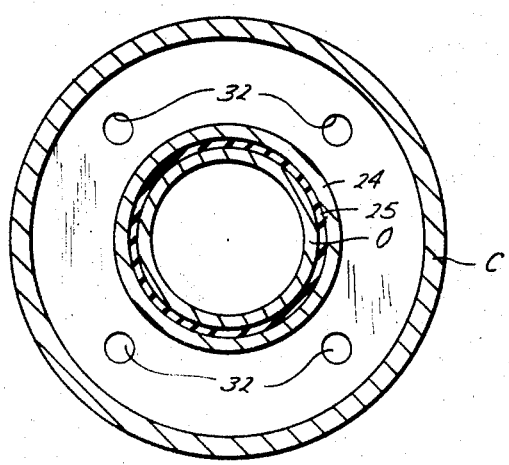
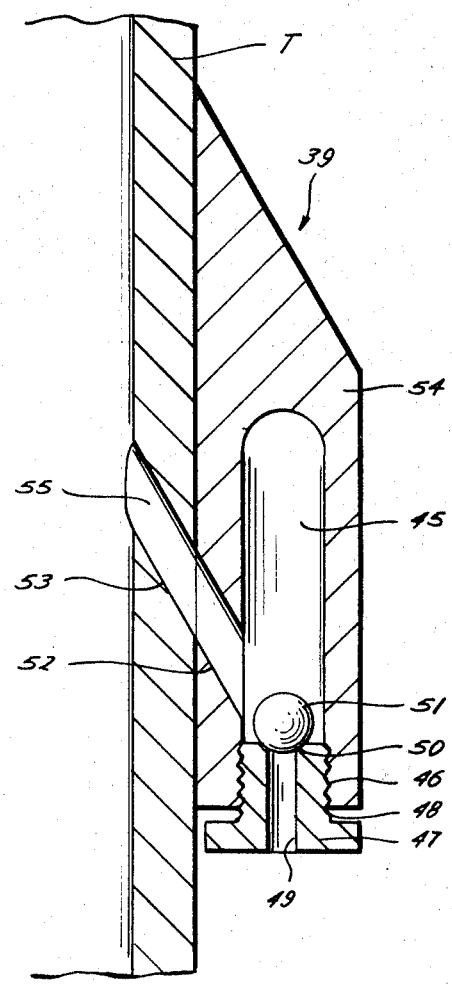

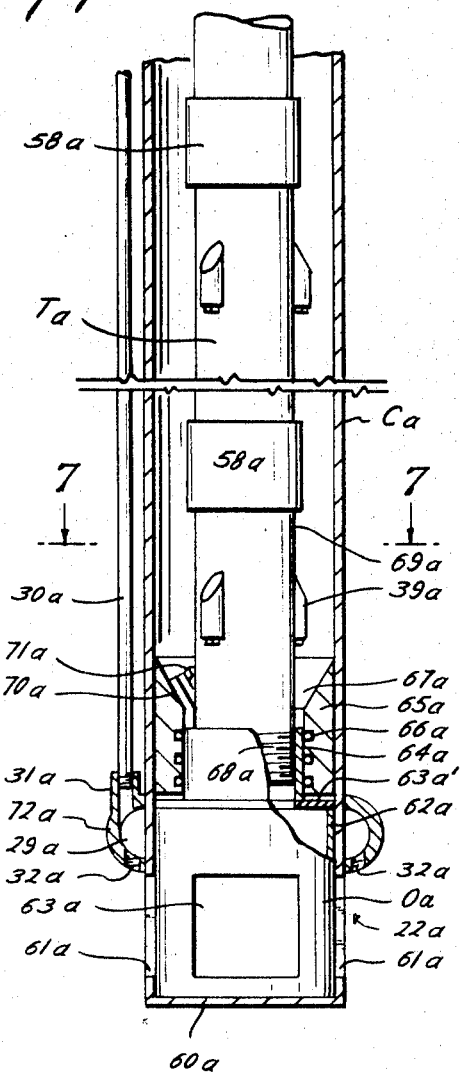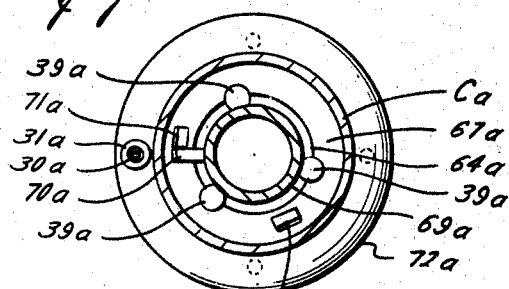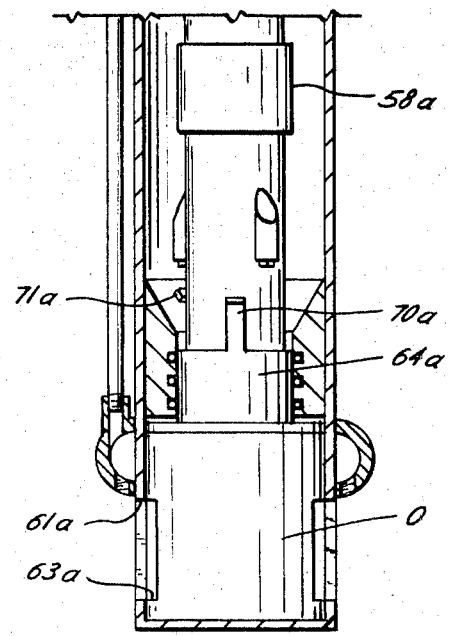
Larry G. Smith
Gordon H. Blake
Jim P. Van Way
INVENTORS
BY Hayden & Pravel
ATTORNEYS

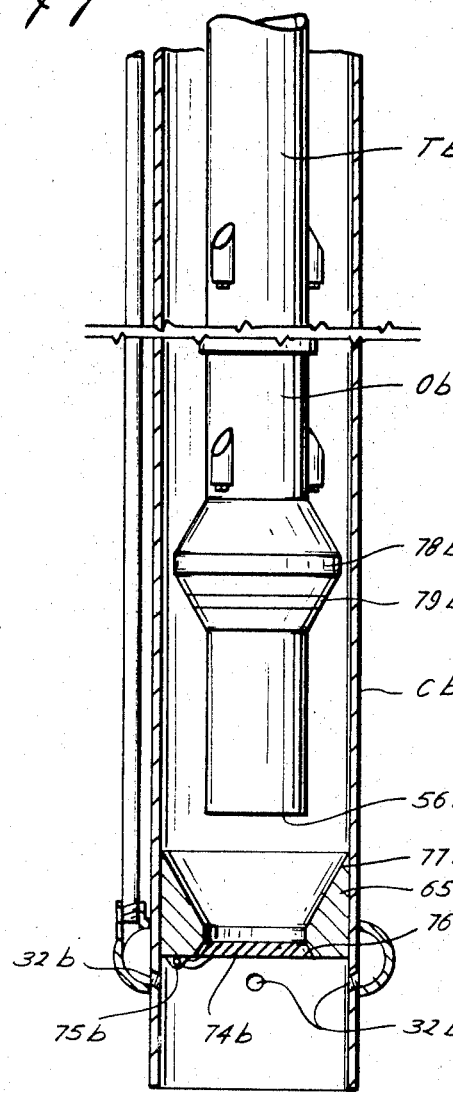
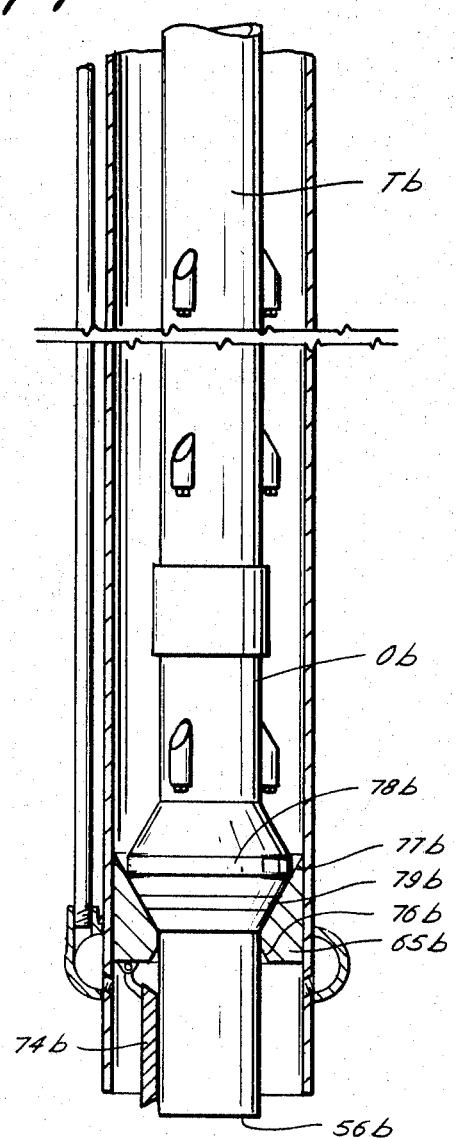

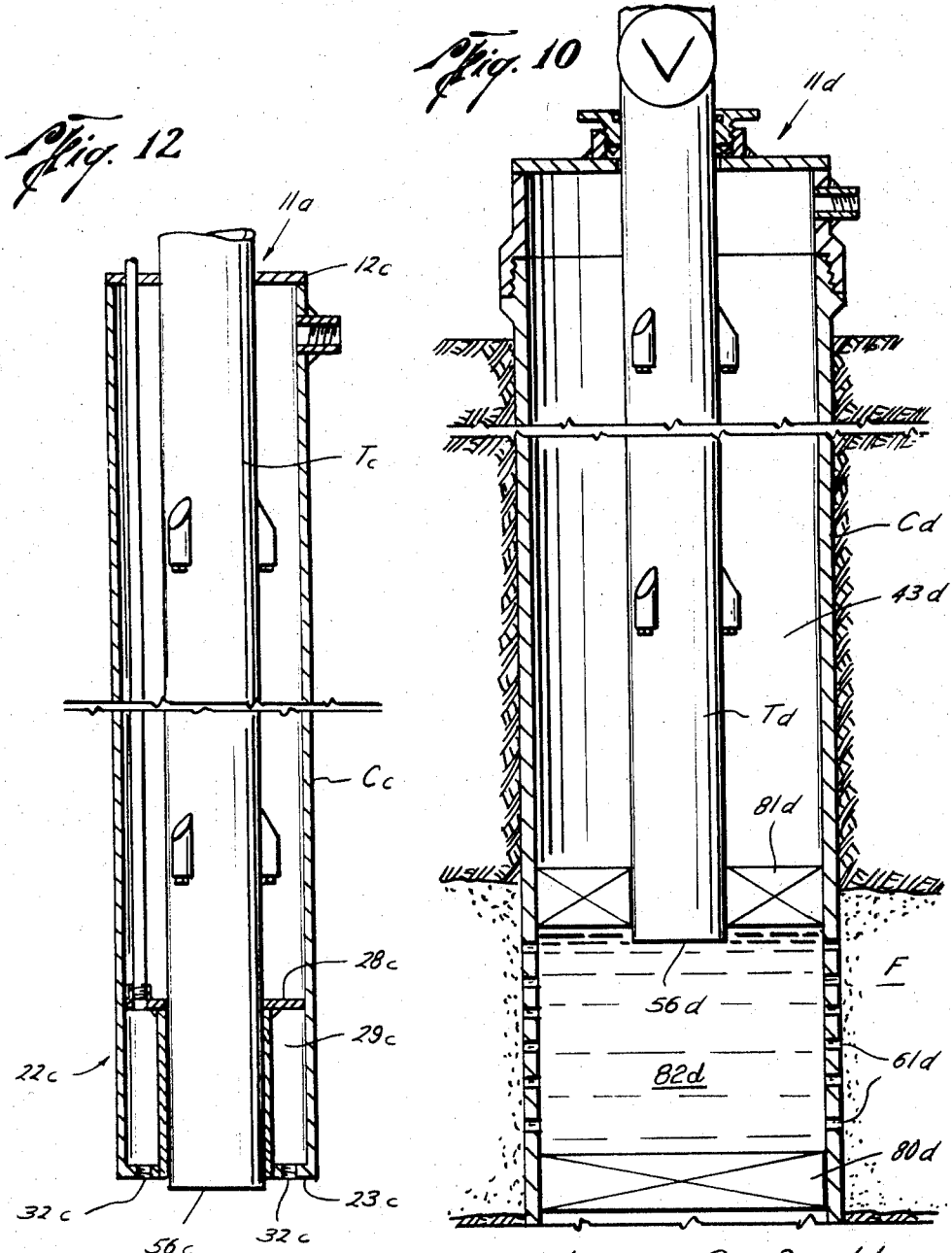

United States Patent Office 3,438,678
Patented Apr. 15, 1969

3,438,678
METHOD AND APPARATUS FOR CONVEYING MATERIALS
Larry G. Smith, Gordon H. Blake, and Jim P. Van Way, Lafayette, La., assignors, by mesne assignments to Alpine Geophysical Associates, Inc., a corporation of New Jersey
Filed Aug. 11, 1966, Ser. No. 571,893
Int. Cl. E21c 37/06; B65g 53/20, 53/04
U.S. Cl. 299—17                                              14 Claims

ABSTRACT OF THE DISCLOSURE

In the preferred embodiments an inner tubing member is concentrically positioned relative to an outer casing member adjacent material formations. A plurality of jets mounted with the tubing member enables a pressurized medium to communicate with the inside of the tubular member thereby creating an upward lifting force for moving the material formation.

---

In some embodiments, a pressurized medium is used to agitate the material formations to enable such formations to be drawn quickly into one end of the tubular member.

The present invention relates to methods and apparatus for conveying aggregates, liquids and other materials from one location to another location.

Broadly stated, the conveyor of the present invention conducts various materials along the interior of a tubular member by injecting a high pressure medium such as, by way of example, compressed air into the tubular member at appropriate intervals along its length. While the following description deals specifically with the retrieval or mining of various materials from below the surface of the earth, it will be appreciated that the ability of the invention to convey material along the unobstructed interior of a tubular member permits its adaptation to a great number of applications. Thus, by way of example only, the conveyor of the present invention may be adapted for use in conveying aggregates such as sand and gravel through an overland pipe-line and, the conveyor may also be employed to elevate or otherwise convey materials such as sewage or sludge which cannot be properly handled by conventional pumping apparatus. The foregoing examples are by way of illustration only and not intended to limit the scope of the present invention.

In the form of the invention as described herein, a well bore is drilled into a subsurface deposit of minerals or other materials, the conveyor is lowered into the well bore and the subsurface deposit is elevated to the surface through the conveyor. This procedure permits recovery and production of subsurface deposits without employing more costly and destructive techniques such as stripmining or the like. Moreover, as will be understood from the following description and drawings, the conveyor of the present invention recovers and produces subsurface deposits of material without pressurizing the formation within which the materials are located.

An important feature of the present invention resides in its provision for opening and closing the inlet openings of the conveyor while the conveyor is in position within the well bore. This feature prevents the surrounding material in the formation from developing obstructions at the inlet openings of the conveyor during periods of inactivity. As will be described, this latter feature also assists in evacuating material from within the interior of the conveyor before it is shutdown to prevent the material contained therein from settling back into the conveyor and developing obstructions.

Another feature of the present invention resides in the provision of a hydraulic system for use within the subsurface formation which assists in conditioning and handling the material while it is being produced.

As will be apparent from the following description and drawings, it is an important object of the present invention to provide means capable of conveying solid or semi-solid materials such as aggregates or sewage from one location to another location.

It is also an object of the present invention to provide means for elevating materials having diverse physical characteristics to any desired height.

It is an object of the present invention to provide a conveyor capable of producing diverse subsurface materials in any desired quantity, at rapid and economical rates.

It is a further object of the present invention to provide a conveyor which is easily installed and operated and is virtually maintenance free.

It is a further object of the present invention to provide a conveyor which prevents obstructions from developing while the conveyor is inactive.

It is also an object of the present invention to provide a conveyor which prevents obstructions from developing during operation of the conveyor.

It is also an object of the present invention to provide a conveyor wherein injection of the high pressure medium may be controlled to best manipulate the particular material being produced.

It is also an object of the present invention to provide a conveyor wherein the injected high pressure medium is prevented from combining with small particles of the material being conveyed to act as a destructive abrasive force upon the interior components of the conveyor.

It is a further object of the present invention to provide a conveyor which can produce materials from any desired subsurface location without pressurizing the subsurface formation.

It is also an object of the present invention to provide a conveyor wherein obstructions may be cleared away from the operational portions of the conveyor by simple expedients without requiring complex and expensive clearing procedures.

It is an important object of the present invention to provide a conveyor having means for agitating and conditioning the material to be produced to thereby facilitate its recovery and production.

It is also an object of the present invention to provide a method for recovering subsurface materials from cased wells.

It is an important object of the present invention to provide a method of conveying materials from one location to another location.

These and other objects are accomplished by the present invention as described in the following specification and drawings wherein:

FIG. 3 is an enlarged sectional view taken along the line 3—3 of FIG. 1 showing further structural details of the form of the invention shown in FIG. 1;

FIG. 4 is an enlarged sectional view taken along the line 4—4 of FIG. 1 showing further structural details of the form of the invention shown in FIG. 1;

FIG. 5 is a partial elevation, partly in section, of a modification of the material conveyor of the present invention, illustrated in a closed condition;

FIG. 6 is a view of the modification of FIG. 5 illustrated in an open condition;

FIG. 7 is an enlarged cross section taken along the line 7—7 of FIG. 5 showing further structural details of the form of the invention shown in FIG. 5;

FIG. 8 is a partial elevation, partly in section, of another modification of the present invention, illustrated in a closed condition;

FIG. 9 is a view of the modification of FIG. 8 illustrated in an open condition;

FIG. 10 is a partial elevation of another modification of the present invention;

FIG. 11 is an enlarged sectional view illustrating one form of a lifting jet that may be used with the present invention; and FIG. 12 is a partial elevation, partly in section, of a modification of the material conveyor of the present invention.

Figure 1:
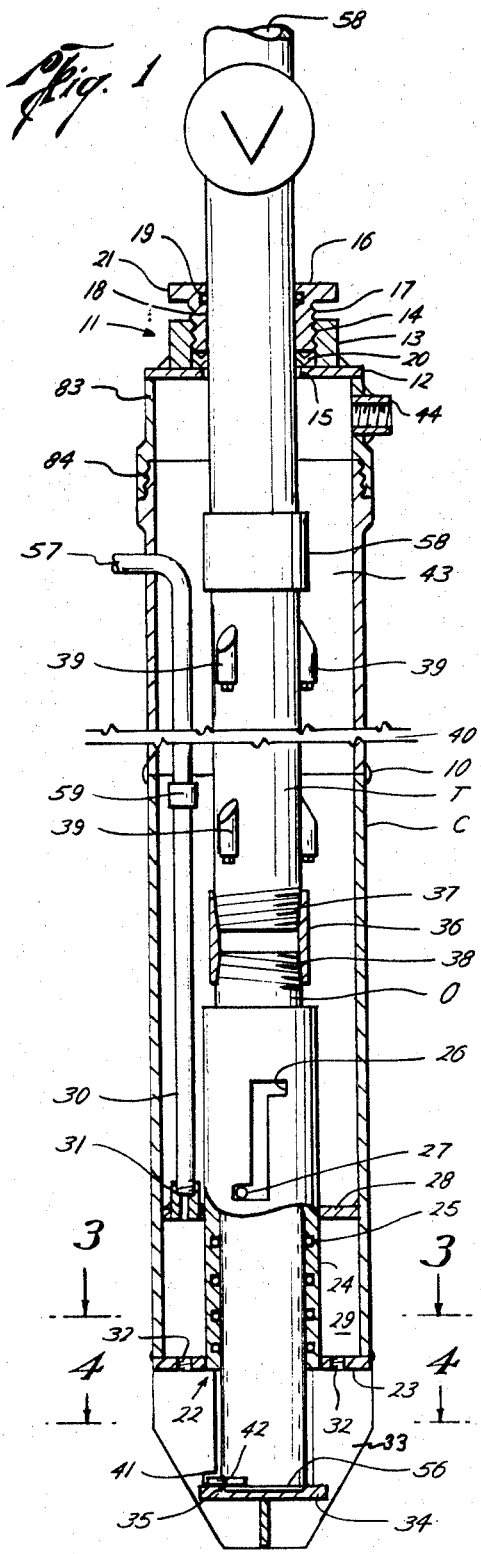
FIG. 1 is an elevation, partly in section, of one form of a pressurized flow material conveyer of the present invention illustrated in a closed condition.

FIG. 1 of the drawings illustrates a preferred embodiment of the pressurized-flow material conveyor of the present invention. The conveyor comprises an inner tubing T positioned within the annulus of an outer casing C. An upper closure means indicated generally at 11 secures the inner tubing T to the casing C and provides a leak-proof seal between the two elements. The closure means 11 comprises a centrally apertured, circular disc 12 which receives the tubing T through a central opening 15. A tubular collar 13 having internal threads 14 is concentrically positioned with respect to the central opening 15 of the disc 12 and is rigidly secured to the disc 12. Received in the collar 13 is a packing nut 16 having external threads 17. The packing nut 16 carries wrench faces on the exterior surface 21 to accommodate a wrench for assisting in engaging and disengaging the packing nut 16 and the collar 13. A resilient O-ring seal 19 is disposed in the opening 18 of the packing nut 16 to assist in providing a leak-proof seal between the tubing T and the packing nut 16. A relatively small, liquid O-ring chamber 20, in the closure means 11, is provided with a highly viscous fluid and a cooperating gasket member which coact to firmly engage the tubing T when the packing nut 16 is tightened into the collar 13. Thus, it may be appreciated that the upper closure means 11 cooperates with the tubing T to provide a leak-proof seal capable of withstanding extreme pressures while also permitting the tubing T to be rotated or to be moved vertically with respect to the casing C.

A lower closure means, indicated generally at 22, comprises a centrally apertured disc 23, a tubular sleeve 24, a tubular operator O slidably received in the sleeve 24, and multiple resilient O-ring seals 25 disposed between the sleeve 24 and the operator O. The construction of the closure means 22, including the O-ring seals 25, permits leak-proof sliding engagement between the operator O and the sleeve 24. The closure means 11 and 22 cooperate to permit the tubing T and the operator O to be raised or lowered with respect to the casing C as desired. The sleeve 24 of the lower closure means 22 is provided with a reverse Z-slot 26 for receiving a projection 27 extending from the operator O. The projection 27 and the reverse Z-slot 26 cooperate to secure the tubing T and the operator O in a raised or lowered position in a manner and for the purpose to be described.

A circular disc 28 is disposed between the sleeve 24 and the casing C defining a small annular chamber 29. The chamber 29 is provided with an input source comprising a hollow conduit 30 which enters the annulus of the casing C below a casing head 83. The conduit 30 extends to the chamber 29 where it is threadedly received in an internally threaded fitting 31 which in turn communicates with the interior of the chamber 29. As best seen in FIG. 3 of the drawings, the exhaust means for the chamber 29 comprises four internally threaded openings 32 in the disc 23. The openings 32 are adapted to receive nozzles (not shown) as will hereinafter be described.

The casing head 83 is threadedly engaged with the casing C at 84 to permit complete removal of the tubing T from the casing C as will be more fully described.

Secured to the casing head 83 is an input port 44 which supplies a primary chamber 43. The primary chamber 43 is defined by the outer casing C, the inner tubing T, the upper closure means 11 and the lower closure means 22. The purpose and operation of the chamber 43 will be hereinafter described in greater detail.

As may be seen in FIGS. 1 and 4 of the drawings, vertical fins 33 are provided below the disc 23. A grooved horizontal plate 34 secured to the fins 33 acts as a closure surface for seating the beveled open end 56 of the operator O. In the closed position illustrated in FIG. 1 of the drawings, the operator O is seated in a cylindrical depression 35 formed in the upper surface of the plate 34. A small notch 41, cut into one of the fins 33, accommodates a projection 42 extending from the lower end of the operator O. The notch 41 and the projection 42 cooperate in assisting to keep the conveyor secured in a closed position. A second projection 42' extends from the operator O for a purpose to be hereinafter described.

The upper end of the operator O is joined to the tubing T by a coupling 36 having right-hand threads 37 and left-hand threads 38 for engagement with corresponding threads of the tubing T and the operator O, respectively. The tubing T is assembled in sections with the individual sections being joined by conventionally threaded couplings represented at the joint 58.

A plurality of jets 39 is distributed in groups of three along an appropriate portion of the length of the tubing T at desired intervals. The three jets of a single group are angularly spaced from each other by approximately 120°. It will be apparent that any number of jets may comprise a single group and that the angular spacing of the jets within a single group may be varied in accordance with the other aspects of the invention.

It may be appreciated that the material conveyor of the present invention may be constructed to any desired lengths. Thus, as indicated by the break 40 in FIG. 1 of the drawings, the tubing T, the conduit 30, and the casing C may be joined in sections as represented at 58, 59 and 10, respectively, whereby the conveyor may be extended indefinitely to permit production at any desired depth. Although not expressly illustrated in the drawings, it will be understood that the jets 39 may be positioned along the entire length of the tubing T, or, along a given portion thereof nearest the closure means 22. The individual groups are disposed at appropriately spaced intervals with the separation of successive groups of jets being governed by various design considerations and desired results.

FIG. 11 of the drawings is an enlarged view illustrating one form of the jets 39 which may be used with the present invention. The jets 39 are illustrated in the drawings as separate components secured to the tubing T by welding or other means, however, it will be appreciated that the jets 39 may be formed as an integral part of the tubing T. The jet 39 illustrated in FIG. 11 of the drawings comprises a body portion 54 having a vertical bore 45 and internal threads 46. The threads 46 are adapted to receive external threads 48 of a fitting 47. The fitting 47 is provided with a small axial bore 49 communicating with the larger bore 45. It will be appreciated that the fitting 47 may be provided with a bore 49 of any desired dimensions depending on the material to be produced, the relative position of the jet along the tubing T, the spacing of the jets and so forth. The upper surface of the fitting 47 is provided with a beveled depression 50 centered about the small bore 49 forming a seat for the ball 51. The ball 51 is received in the beveled depression 50 and acts as a check valve for the purpose and in a manner to be hereinafter more fully described. A jet port 55, comprising axially aligned and angularly inclined bores 52 and 53 provided in the body portion of the jet 39 and the tubing T, respectively, affords a means of communication between the chamber 43 and the interior of the inner tubing T. Each of the jet ports 55 of a single group of jets 39 is constructed and arranged so that the plural axes of the jet ports intersect at the same point along the axis of the tubing T.

Figure 2:
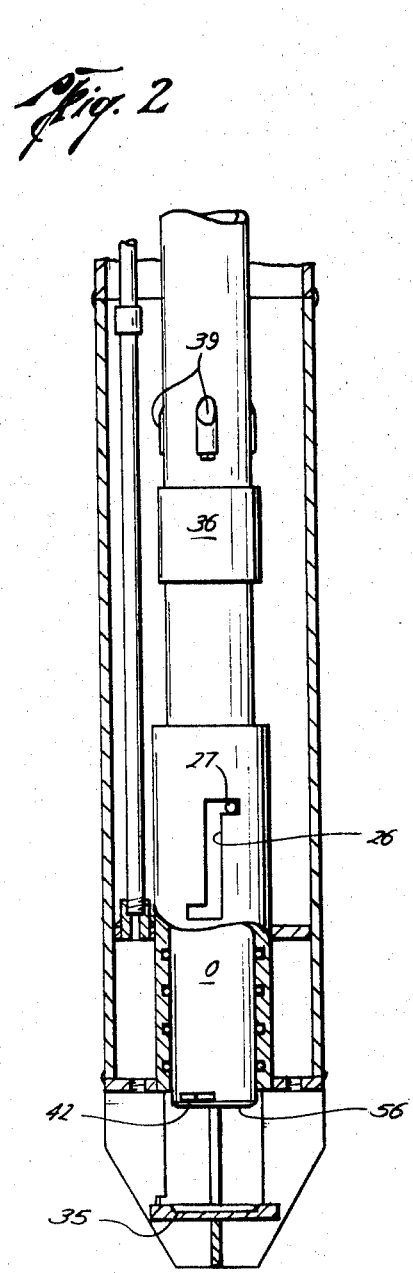
FIG. 2 is a partial elevational view of the form of the invention shown in FIG. 1 and illustrating the material conveyor in an open condition.

In the operation of the material conveyor illustrated in FIGS. 1 and 2 of the drawings, a power source comprising a high pressure gas, for example compressed air, is introduced into the chamber 43 through the input port 44 where it is communicated by the chamber 43 to the individual jets 39. The pressure differential between the high pressure chamber 43 and the lower pressure interior of the tubing T creates forces causing the ball 51 situated within the jet 39 to move away from the beveled depression 50 and up into the upper portion of the bore 45. This action within the jet 39 permits the high pressure gas in the chamber 43 to flow through the port 55 and into the interior of the tubing T where it emerges in a relatively high velocity jet stream. The one-way valve action of the ball 51 prevents material contained within the interior of the tubing T from entering the chamber 43 through the jet port 55 when the high pressure gas supply is removed. The upward slope of the port 55 directs the resulting jet stream of gas in an upward direction along the interior of the tubing T where it meets with the other jet streams of the group at a common point along the longitudinal axis of the tubing T. The construction and arrangement of the three jets 39 causes the three jet streams of the group to mutually deflect each other and produce a single, upwardly directed flow coincident with the axis of the tubing T. The production of an axially directed gas flow within the tubing T maximizes the lifting action of the individual jet streams and also minimizes and prevents abrasion and eventual destruction of the tubing T. With respect to this latter feature, the abrasive effect on the tubing T would otherwise occur when small particles of the material being produced are blasted against the opposing interior surface of the tubing T by an undeflected jet stream.

The groups of jets 39 positioned along the length of the tubing T produce a cooperating succession of partial vacuum regions and upwardly directed forces which lift and convey material along the interior of the tubing T. Thus, in the open position illustrated in FIG. 2 of the drawings, the partial vacuum created at the opening 56 of the operator O draws the material to be conveyed through the openings 56, into the interior of the operator O and up into the tubing T where the groups of jets 39 positioned along the tubing T cooperate to convey the material along the tubing T, through the valve V and out the output portion 58.

The conduit 30 supplies a pressurized fluid, for example water, to the chamber 29 where the fluid is conveyed to the four exhaust openings 32. The fluid is emitted from the openings 32 in relatively high velocity streams which agitate the material adjacent and in the vicinity of the opening 56. The fins 33 assist in imparting general direction to the fluid streams and the internally threaded exhaust openings 32 are adapted to be fitted with appropriately threaded nozzles (not shown) for more precise direction of the fluid stream. The nozzles may thus be changed to provide the configuration and opening best designed to properly manipulate the particular material being produced. The fluid streams serve multifold functions such as providing assistance in freeing the material to be produced from the surrounding formation, supplying liquid to the formation to create a slurry for assisting in transporting material from remote points in the formation to the inlet opening 56 of the conveyor, breaking large sections of the material being produced into smaller constituent parts and preventing obstruction of the opening 56.

While in operation, the conveyor is maintained in the open position illustrated in FIG. 2 of the drawings by the interaction of the reverse Z-slot 26 and the projection 27. Thus, the projection 27 is engaged in the upper horizontal portion of the reverse Z-slot 26, preventing vertical movement of the operator O.

A clockwise rotation of the tubing T from the position illustrated in FIG. 2 of the drawings will align the projection 27 with the vertical body portion of the reverse Z-slot. The tubing T may then be vertically lowered until the projection 27 meets the lower boundary of the slot 26. Further clockwise rotation of the tubing T locks the conveyor in the closed condition illustrated in FIG. 1 of the drawings by engaging the projection 27 with the lower horizontal portion of the slot 26 which thus prevents further vertical movement of the operator O. In the closed position illustrated in FIG. 1 of the drawings, the projection 42 engages with the notch 41 of the fin 33, further ensuring against vertical displacement of the operator O. The conveyor may be transformed into the open condition simply by reversing the foregoing procedure.

As before noted, the opening 56 of the operator O is seated in the depression 35 when the conveyor is in a closed position. In this position, the surrounding external material of the formation is prevented from settling into, clogging and otherwise obstructing the opening 56. As a further step in the shutting-down procedure, the high pressure gas is supplied to the chamber 43 while the conveyor is in the closed condition until substantially all of the material remaining within the tubing T has been expelled. This procedure and the one-way valve action of the jets 39 assure proper operation of the conveyor when the conveyor is shutdown and operated again at a later time.

If the tubing T or the opening 56 should become obstructed, the conveyor is transformed to the open condition, the valve V is closed and the high pressure gas is forced through the jet ports 55 into the interior of the tubing T. The valve V prevents the gas from escaping through the opening 58, and the gas is thus forced out through the inlet opening 56 at the lower end of the operator O. This procedure pushes away surrounding obstructions and frees the opening 56 so that normal operation may be resumed.

As before noted, the tubing T and the operator O are secured to each other by the coupling 36. The left-hand threads 38 of the operator O disengage from the corresponding threads in the coupling 36 when the tubing T is rotated sufficiently, in a clockwise direction. It may be appreciated that when the conveyor is in an open position, initial clockwise rotation of the tubing T moves the projection 27 into alignment with the vertical portion of the slot 26 and permits the projection 27 to be lowered, thus closing the conveyor. Continued rotation of the tubing T in the same direction locks the projection 27 against the far edge of the lower horizontal arm of the slot 26 and prevents any further clockwise rotation of the operator O with respect to the sleeve 24. If the tubing T is rotated beyond this point in the same direction with sufficient force to overcome the frictional forces existing between the coupling 36 and the operator O, the threads 38 of the operator O will disengage from the coupling 36. When thus freed from the operator O, the tubing T may be withdrawn from the casing C by removing the casing head 83. Clockwise rotation of the tubing T acts to tighten the conventional joints 58 of the tubing T thus precluding separation of the tubing T except at the collar 36. In the initial assembly of the tubing T, the conventional tubing joints 58, above the collar 36, are securely tightened so that the counter-clockwise rotation required to reengage the operator O and the tubing T will not cause separation of the conventional joints 58.

If desired, the reverse Z-slot 26 and its cooperating projection 27 may be omitted and the conveyor may be locked in the closed condition solely by the operation of the notch 41 and the projections 42 and 42'. In this latter embodiment, the conveyor is transformed to the open condition by rotating the tubing T in a counterclockwise direction until the projection 42 engages one of the fins 33. The tubing T may then be raised until the projections 42 and 42' encounter the disc 23. The conveyor is maintained in the open condition by maintaining the lifting force on the tubing T. Disassembly of the conveyor is effected by rotating the tubing T in a clockwise direction until the projection 42' encounters one of the fins 33 as illustrated in FIG. 4 of the drawings. The engagement of the projection 42' and the fin 33 prevents further rotation of the operator O and, continued clockwise rotation of the tubing T will disengage the tubing T and the operator O. The tubing T and the operator O may be reunited by reversing the foregoing process.

As before noted, the function of the primary chamber 43 is to contain the high pressure gas introduced at the input opening 44 and communicate the gas to the jets 39. Maximum effectiveness requires that all joints and seams in the structure of the chamber 43 be sufficiently strong to withstand the high pressures encountered within the chamber. Where extremely high gas pressure is to be employed, the casing C is preferably welded as shown at 10. In less rigorous applications, involving lower gas pressure, conventional pin and box joints may be employed in assembling sections of the casing C.

In employing the present invention, a well bore is drilled to a desired depth by conventional methods. The conveyor is lowered into the well bore with sections of the outer casing C, the inner tubing T and the conduit 30 being added to the conveyor as it is being lowered into the well bore. When the inlet opening 56 of the conveyor has been located at the desired depth, the conveyor is transformed into the open condition. The casing head 83 is then secured to the casing C and the packing nut 16 is tightened into the collar 13 to seal the closure means 11. Water is supplied to the conduit 30 and pressurized gas is supplied to the chamber 43 through the input opening 44. When the valve V is in an open position, the material in the formation surrounding the inlet opening 56 is drawn into the tubing T and is emitted at the surface through the opening 58 as hereinbefore described.

It will be understood that if desired, a pressurized liquid such as water may be supplied to the chamber 43 through the input opening 44 to function as the high pressure medium or power source. The liquid acts in a manner similar to that described with respect to the use of a high pressure gas. Similarly, various combinations of liquids and gases may also be employed.

It is also anticipated by the present invention that the pressurized fluid applied to the chamber 29 by the conduit 30 may be replaced by a gas. Under certain conditions, for example where it is desired to fracture the formation, it may be desirable to pressurize the formation itself. In the latter event, the conduit 30, the chamber 29 and the exhaust openings 32 cooperate to provide means for introducing a high pressure fluid or gas into the formation. It should however be emphasized that under typical operation of the conveyor, the formation is not pressurized, because, as before noted, the ability of the conveyor to produce without pressurizing the formation is one of its outstanding advantages.

FIGS. 5, 6 and 7 of the drawings illustrate a modification of the lower closure means employed in the conveyor of the present invention. FIGS. 5 and 7 illustrate the conveyor in the fully closed condition while FIG. 6 illustrates the conveyor in the fully opened condition. Although not shown, it will be understood that the modification illustrated in FIGS. 5, 6 and 7 of the drawings is provided with upper closure means corresponding to the upper closure means 11 illustrated in FIG. 1 of the drawings. In FIGS. 5, 6 and 7, the conveyor is illustrated as comprising an outer casing Ca, an inner tubing Ta and a lower closure means indicated generally at 22a. The tubing Ta is provided with jets 39a, angularly spaced about the circumference of the tubing Ta at 120° intervals.

The angular disposition of the jets 39a may best be seen in FIG. 7 of the drawings. A fluid conduit 30a is threadedly received in a fitting 31a which in turn extends through the wall structure 72a of the enclosed annular chamber 29a. It should be noted that in the embodiment of FIGS. 5, 6 and 7, the conduit and the chamber are externally disposed with respect to the casing Ca, whereas, in the embodiment of FIGS. 1–4, the conduit and chamber are carried within the annulus of the casing. It will be understood that the two forms are interchangeable. In the embodiment of FIGS. 5, 6 and 7, the chamber 29a is provided with internally threaded exhaust openings 32a adapted to receive correspondingly threaded nozzle fittings (not shown), or, alternatively, to be employed as illustrated, without the nozzle attachment. Two inlet openings 61a are provided in the wall of the casing Ca below the annular chamber 29a. The lower axial end of the casing Ca is enclosed by a circular disc 60a. The closure means 22a also includes an operator Oa, positioned within the casing Ca with the tubular body portion 62a of the operator Oa closely conforming to the interior cylindrical surface of the casing Ca. The body portion 62a of the operator Oa is cut away to form openings 63a. The dimensions of the openings 63a correspond to the dimensions of the openings 61a provided in the casing Ca. The body portion 62a is secured to a centrally apertured disc 63a' which in turn is secured to an internally threaded collar 64a. A reducing element 65a is disposed between the casing Ca and the collar 64a. The external cylindrical surface of the reducing element 65a is securely mounted on the interior cylindrical surface of the casing Ca. Three resilient O-ring seals 66a are carried on the inner cylindrical surface of the reducing element 65a to provide a leak-proof seal between the collar 64a and the reducing element 65a. The upper portion of the reducing element 64a is provided with a sloped surface 67a to assist in aligning the operator Oa and the tubing Ta as will be hereinafter described. The collar 64a is internally threaded with a left-hand thread corresponding to the mating external threads 68a of the tubing section 69a. As may best be seen in FIG. 7 of the drawings, a stop-arm 70a extend from the upper rim of the collar 64a and is adapted to engage two stationary pins 71a and 73a which project from the surface 67a.

The conveyor may be transformed from the closed position illustrated in FIGS. 5 and 7 of the drawings to the open condition of FIG. 6 by rotating the tubing Ta in a counterclockwise direction until the stop-arm 70a of the collar 64a abuts the pin 73a. Conversely, clockwise rotation of the tubing Ta transforms the conveyor into the closed condition. In disassembling the conveyor, the operator Oa may be rotated in a clockwise direction until the stop-arm 70a engages the pin 71a corresponding to the full closed position. Further clockwise rotation of the tubing T disengages the lefthand threads 68a of the tubing section 69a from the collar 64a. The tubing may then be removed from the casing Ca with the conveyor remaining in a closed condition. In reassembling the tubing and the operator, the sloped surface 67a assists in aligning the threads 68a of the tubing section 67a with the internally threaded collar 64a of the operator Oa. Counterclockwise rotation of the tubing Ta engages the threads 68a with the threads of the internally threaded collar 64a and transforms the conveyor into the open condition. It will be appreciated that, as a part of the foregoing procedure, the conventional joints 58a have been securely tightened to prevent them from separating during the counter-clockwise rotation of the tubing Ta.

In the open condition of the conveyor illustrated in FIG. 6, the material to be produced enters the opening 61a of the casing Ca, travels through the openings 63a of the operator Oa and up into the tubing section 69a.

In the modification illustrated in FIGS. 8 and 9 of the drawings, a spring loaded flapper valve is employed as an element of the lower closure means of the conveyor. Thus, in FIG. 8 of the drawings, a spring-loaded, flapper valve plate 74b, with hinge means 75b, is illustrated in a closed position. The hinge means 75b which carries the spring loading mechanism is mounted on the lower surface of a centrally apertured reducing element 65b. The outer cylindrical surface of the reducing element 65b is rigidly secured to the inner cylindrical surface of the casing Cb. The central opening of the reducing element 65b is beveled to provide a valve seat 76b for receiving the correspondingly configured valve plate 74b. A second seating surface 77b is provided on the reducing element 65b for receiving a correspondingly configured enlargement 78b of the operator Ob. The enlargement 78b carries a resilient O-ring gasket 79b to ensure a leak-proof seal between the operator Ob and the reducing element 65b. In the embodiment of FIGS. 8 and 9 of the drawings, the internally threaded exhaust openings 32b open into the interior of the casing Cb. It will of course be appreciated that the exhaust openings 32b may open externally of the casing Cb.

The conveyor may be transformed from the closed condition illustrated in FIG. 8 of the drawings into the open condition of FIG. 9 by lowering the tubing Tb into the casing Cb. During the lowering procedure, the lower portion of the operator Ob engages the valve plate 74b and displaces it against the spring loaded mechanism in the hinge means 75b. Continued lowering of the tubing Tb seats the enlargement 78b on the surface 77b of the reducing element 65b. In this condition, the material being produced may enter the exposed open end 56b of the operator Ob and be conveyed up and through the tubing Tb. Transformation into the closed condition may be effected simply by lifting the tubing Tb sufficiently to permit the spring loaded mechanism to swing the plate 74b into the seating surface 76b.

FIG. 12 of the drawings illustrates another modification of the present invention wherein the conveyor is constructed in a permanently open condition. The modification of FIG. 12 is particularly advantageous when employed in conjunction with the production of materials which are not likely to obstruct the conveyor or when the conveyor may be removed as a unit from the material to be conveyed. The lower closure means indicated generally at 22c, comprise a centrally apertured disc 28c secured along its circumference to the inner cylindrical surface of the casing Cc. The tubing Tc extends through the central aperture of the disc 28c and is immovably and rigidly affixed to the disc 28c. The open end 56c of the tubing Tc projects through a second centrally apertured disc 23c secured to the bottom of the casing Cc. The disc 23c is provided with internally threaded exhaust openings 32c communicating with the chamber 29c.

The upper closure means, indicated generally at 11c, comprises a centrally apertured disc 12c rigidly welded to both the casing Cc and the tubing Tc. In the illustrated construction of the closure means 11c, there is no provision for relative rotation between the casing Cc and the tubing Tc. It will be appreciated, however, that if relative motion is desired, an upper closure means and a casing head corresponding to the upper closure means 11 and the casing head 83, respectively, of the embodiment illustrated in FIG. 1, may be adapted to the conveyor illustrated in FIG. 12. Similarly, a left-hand thread and collar arrangement, corresponding to those already disclosed, may be employed to permit removal of the tubing Tc from the casing Cc.

FIG. 10 illustrates the application of the present invention to the production of fluids, such as oil or water, from a cased well. In practicing the method of FIG. 10, a bore hole may be drilled to the desired depth and cased or the method may be practiced in conjunction with an existing, precased well. In either case, the casing Cd is perforated, as indicated by the holes 61d, at the desired depth to provide access to the subsurface formation F. A first plug 80d is set in the casing Cd below the perforation 61d to provide a leak-proof seal between the regions occupying the interior of the casing Cd above and below the plug 80d. A second, centrally apertured plug 81d is set in the casing Cd, above the perforations 61d, forming a leak-proof seal between the tubing Td and the casing Cd. The open end 56d of the tubing Td extends into the chamber 82d formed within the annulus of the casing Cd between the two plugs 81d and 80d. An upper closure means 11d is provided at the top of the well casing Cd to form the primary chamber 43d. The closure means 11d corresponds to the closure means 11 illustrated in FIG. 1 of the drawings.

In the embodiment of FIG. 10, the material to be produced is drawn through the perforations 61d, into the chamber 82d and to the inlet opening 56d where it is conveyed up along the tubing Td, to the surface.

Many modifications may be made in the present invention without departing from the spirit and scope thereof; accordingly, the scope of the present invention is defined only by the claims appended hereto.

What is claimed is:

1. A pressurized flow material conveyor comprising:
  (a) an exterior casing member;
  (b) an inner tubing member disposed within said exterior casing member, said inner tubing member being of substantially the same length as said casing member and having an inlet portion, a body portion and an output portion;
  (c) first and second closure means defining a primary chamber, said first and second closure means being axially spaced along the axis of said inner tubing member and disposed between said inner tubing member and said external casing member adjacent said inlet and output portion of said inner tubing member;
  (d) an input port opening into said primary chamber;
  (e) a conduit having an input end, a body section and an exhaust end, said exhaust end opening externally of said primary chamber adjacent said inlet portion of said inner tubing member adjacent said second closure means; and
  (f) at least one jet port extending from said primary chamber into the interior of said inner tubing member.

2. The conveyor of claim 1 above further including means for opening and closing said inlet portion of said inner tubing member.

3. The conveyor of claim 1 above further including means for preventing material contained within the body portion of said inner tubing member from entering said primary chamber.

4. The conveyor of claim 1 above further including means for disengaging said inner tubing member from said outer casing member.

5. The conveyor of claim 1 above including plural jet ports extending from said primary chamber into the interior of said inner tubing member, said plural jet ports being angularly disposed about a point along the longitudinal axis of the inner tubing member with the central axis of each of said plural ports intersecting at the same point along the longitudinal axis of said inner tubing member.

6. The conveyor of claim 5 above further including:
  (a) means for opening and closing said inlet portion of said inner tubing member;
  (b) means for preventing material contained within the interior of said inner tubing member from entering said primary chamber through said plural jet ports; and
  (c) means for disengaging said inner tubing member from said outer casing member.

7. A method of conveying material from a first location to a second location through a hollow, elongated member having a first end and a second end, comprising the steps of:

(1) placing the first open end of the hollow, elongated member in proximity with the material at the first location;

(2) placing the second open end of the member in proximity with the second location;

(3) injecting a liquid medium into the material at the first location;

(4) conveying the material from the first location through the interior of the hollow, elongated member to the second location by injecting a high pressure gaseous medium into the lower pressure region within the interior of the hollow elongated member at spaced ports along the length of the member between the first and second ends of the member;

(5) partially evacuating the interior of the hollow member by closing off the first end of the member while maintaining the injection of the high pressure gaseous medium;

(6) terminating the injection of the high-pressure gaseous medium; and (7) closing off the spaced ports along the length of the member.

8. A method of conveying material from a first location to a second location through a hollow, elongated member having a first end and a second end, comprising the steps of:

(1) placing the first open end of the hollow, elongated member in proximity with the material at the first location;

(2) placing the second open end of the member in proximity with the second location;

(3) injecting a liquid medium into the material at the first location;

(4) conveying the material from the first location through the interior of the hollow, elongated member to the second location by injecting a high pressure gaseous medium into the lower pressure region within the interior of the hollow elongated member at spaced ports along the length of the member between the first and second ends of the member; and (5) closing the second end of the hollow, elongated member while maintaining the injection of the high-pressure gaseous medium.

9. A pressurized flow material conveyor comprising:
(a) an exterior casing member;
(b) an inner tubing member disposed within said exterior casing member, said inner tubing member having an inlet portion, a body portion and an output portion;
(c) first and second closure means defining a primary chamber, said first and second closure means being axially spaced along the axis of said inner tubing member and disposed between said inner tubing member and said external casing member;
(d) an input port opening into said primary chamber;
(e) a conduit having an input end, a body section and an exhaust end, said exhaust end opening externally of said primary chamber adjacent said inlet portion of said inner tubing member;
(f) a plurality of jet ports extending from said primary chamber into the interior of said inner tubing member, said plurality of jet ports being angularly disposed about a point along the longitudinal axis of the inner tubing member with the central axis of each of said port or ports intersecting at the same point along the longitudinal axis of said inner tubing members;
(g) means for opening and closing said inlet portion of said inner tubing member, said means for opening and closing including:
  (1) an operator having an open end and a connected end, said operator being slidably received within a sleeve;
  (2) means cooperating with said operator for locking the conveyor in a closed position; and
  (3) a closure plate disposed transversely to said operator;
(h) means for preventing material contained within the interior of said inner tubing member from entering said primary chamber through said plural jet port; and
(i) means for disengaging said inner tubing member from said outer casing member.

10. The conveyor of claim 9 above wherein said means for disengaging said inner tubing member from said outer casing member includes left-hand threads on said connected end of said operator.

11. The conveyor of claim 9 above wherein said operator includes an apertured end and a connected end and at least one opening cut into said outer casing member, said operator being rotatably disposed within said outer casing member adjacent said opening of said outer casing member.

12. The conveyor of claim 11 above wherein said means for disengaging said inner tubing member from said outer casing member includes left-hand threads provided at said connected end of said operator.

13. A pressurized flow material conveyor comprising:
(a) an exterior casing member;
(b) an inner tubing member disposed within said exterior casing member, said inner tubing member having an inlet portion, a body portion and an output portion;
(c) first and second closure means defining a primary chamber, said first and second closure means being axially spaced along the axis of said inner tubing member and disposed between said inner tubing member and said external casing member;
(d) an input port opening into said primary chamber;
(e) a conduit having an input end, a body section and an exhaust end, said exhaust end opening externally of said primary chamber adjacent said inlet portion of said inner tubing member;
(f) a plurality of jet ports extending from said primary chamber into the interior of said inner tubing member, said plurality of jet ports being angularly disposed about a point along the longitudinal axis of the inner tubing member with the central axis of each of said port or ports intersecting at the same point along the longitudinal axis of said inner tubing members; and
(g) means for opening and closing said inlet portion of said inner tubing member, said means for opening and closing including a spring-loaded flapper valve.

14. The conveyor of claim 13 above when said means for disengaging said inner tubing member from said outer casing member includes an enlargement on said inner tubing member removably seated on a constriction formed within said outer casing member.

References Cited

UNITED STATES PATENTS

| | | | |
|---|---|---|---|
| 1,314,793 | 9/1919 | Ebeling | 37—62 |
| 1,547,197 | 7/1925 | Arbon | 103—232 X |
| 1,658,345 | 2/1928 | Little | 103—232 |
| 1,739,041 | 10/1929 | Ragland | 103—232 |
| 2,146,790 | 2/1939 | Brewer | 37—62 |
| 2,906,040 | 9/1959 | Hefling | 37—62 |
| 3,289,609 | 12/1966 | Palo | 103—232 |
| 1,305,487 | 6/1919 | Owen | 103—233 |
| 3,063,755 | 11/1962 | Wijdeveld et al. | 302—58 |

ERNEST R. PURSER, *Primary Examiner.*

U.S. Cl. X.R.

37—62; 302—15, 66